United States Patent
Hahn et al.

[15] 3,640,138
[45] Feb. 8, 1972

[54] MACHINE TOOL

[72] Inventors: Robert S. Hahn, Northboro; Thomas R. Keefe, Framingham, both of Mass.

[73] Assignee: The Heald Machine Company, Worcester, Mass.

[22] Filed: Dec. 12, 1969

[21] Appl. No.: 884,450

[52] U.S. Cl.................................................74/89.15, 308/9
[51] Int. Cl.............................................................F16h 27/02
[58] Field of Search.....................................74/89.15; 308/9

[56] References Cited

UNITED STATES PATENTS

| | | | |
|---|---|---|---|
| 2,756,114 | 7/1956 | Brunzel | 308/9 |
| 3,398,484 | 8/1968 | Katsumura et al. | 74/89.15 |
| 3,420,583 | 1/1969 | Hirs | 308/9 |
| 3,497,273 | 2/1970 | Mhijderman et al. | 308/9 |

Primary Examiner—Milton Kaufman
Assistant Examiner—Wesley S. Ratliff, Jr.
Attorney—Norman S. Blodgett

[57] ABSTRACT

This invention relates to a machine tool and, more particularly, to machinery having a table which is slidable with substantially no friction, which is screw-driven, and which has means for restraining the screw to prevent erratic movement of the table.

5 Claims, 6 Drawing Figures

PATENTED FEB 8 1972

$$C = \frac{2A^2}{a_1 + a_2} \qquad a_1 = \frac{\pi D h_1^3}{12 u \ell_1} \qquad a_2 = \frac{\pi d h_2^3}{12 u \ell_2}$$

$$A = \frac{\pi}{4}(D^2 - d^2)$$

INVENTORS
ROBERT S. HAHN
THOMAS R. KEEFE

BY *Thomas S. Blodgett*

ATTORNEY

MACHINE TOOL

BACKGROUND OF THE INVENTION

In the design and manufacture of machine tools, it has been possible to provide ways and guides for the moving tables which are very free of friction. One of the methods of accomplishing this is providing the way with hydrostatic pads, so that the table rests on a film of lubricant at all times and so that there is substantially no coulomb friction between the ways and the table. The introduction of such friction-free tables, however, as beneficial as it has been, has also presented some other problems. The elasticity of certain parts of the machine, particularly a screw-type drive, assumes greater importance. The spring constant of the screw, even though it is large, assumes appreciable proportions, particularly when uneven loading takes place on the screw. This would be, for instance, when the table of the machine tool carries a tool and the tool moves from the loaded to the unloaded condition, as is normal in the machining of workpieces. Attempts to fasten and hold the screw rigidly at the ends have been less than successful because thermal expansion and contraction sets up undesirable stresses in the s crew. These and other difficulties experienced with the prior art devices have been obviated in a novel manner by the present invention.

It is, therefore, an outstanding object of the invention to provide a machine tool with friction-free ways in which a screw drive does not introduce unwanted vibrations into the system.

Another object of this invention is the provision of a machine tool having a table which is driven by a screw which is actuated by a servomotor, wherein unwanted vibrations due to the elasticity of the screw are removed.

A further object of the present invention is the provision of a machine tool having means for supporting a screw drive in such a way that vibrations are not generated.

With these and other objects in view, as will be apparent to those skilled in the art, the invention resides in the combination of parts set forth in the specification and covered by the claims appended hereto.

SUMMARY OF THE INVENTION

In general, the present invention consists of a machine tool having a base and a table mounted on ways forming part of the base for linear sliding movement thereover. A screw extends parallel to the ways and a ball-type nut is fastened to the table and operatively engageable with an intermediate portion of the screw. A rotary operating motor is fastened to the base and drives one end of the screw. A damper is provided at the other end of the screw, the damper consisting of a housing fastened to the base, a piston fastened to the screw, the piston being movable in a short bore in the housing. A fluid pressure source is connected to the intermediate part of the bore, there being a clearance between the piston and the bore to allow the passage of fluid to the ends of the bore.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
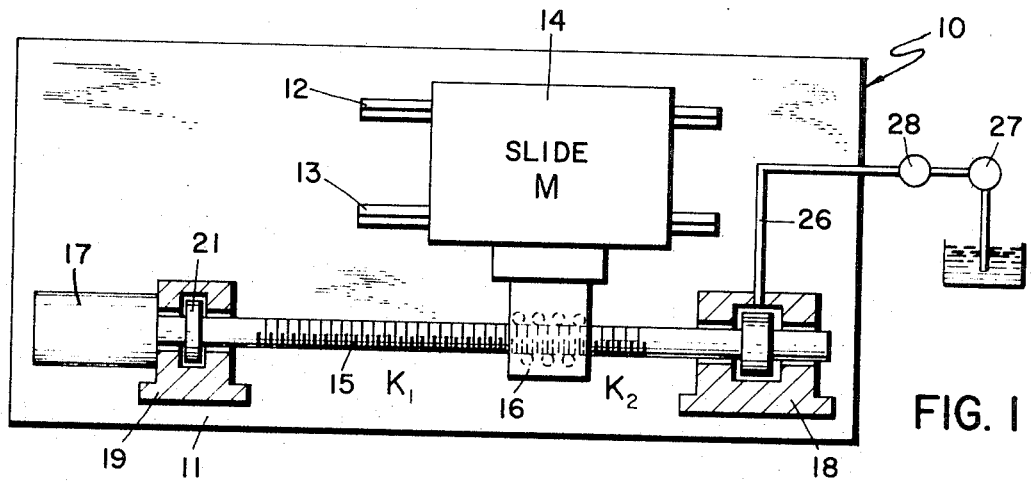
FIG. 1 is a schematic view of a machine tool embodying the principles of the present invention.

Referring first to FIG. 1, which best shows the general features of the invention, the machine tool, indicated generally by the reference numeral 10, is shown as having a base 11 which is provided with ways 12 and 13 on which is slidably mounted a table 14. The ways are constructed in the well-known manner to provide for a hydrostatic film of oil between the table 14 and the ways; one manner in which this can be accomplished is shown in the patent application of Uhtenwoldt, Ser. No. 729,690, filed May 16, 1968. A screw 15 extends along the table parallel to the ways 12 and 13 and is engageable with a ball-type nut 16 fastened to the table and operatively engageable with the intermediate portion of the screw. A rotary motor such as a servomotor 17 is fastened to the base 11 and drives one end of the screw 15. A damper 18 is provided at the other end of the screw. The end of the screw adjacent the motor 17 is supported by a bearing 19 which is capable of absorbing radial and thrust loads and is engageable with a collar 21 forming part of the screw 15.

Figure 2:
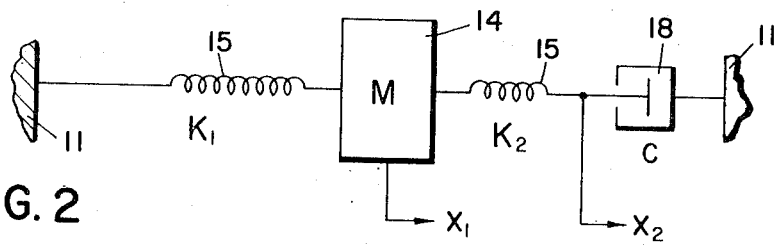
FIG. 2 is a diagrammatic view of the important parts of the drive for the machine tool.

FIG. 2 shows the manner in which the screw 15 on the elements associated with it can be treated for the purposes of mathematical analysis. The slide 14 is indicated by a mass M. The portion of the screw 15 between the slide 14 and the bearing 19 acts as a spring with a spring constant $K_1$, while the portion of the screw between the slide 14 and the damper 18 can be treated as a spring with a spring constant $K_2$. The damper introduces a dashpot of strength C, while the deflection of the table 14 is indicated by the variable $X_1$. The deflection of the screw 15 in the vicinity of the damper 18 is indicated by the variable $X_2$.

Figure 3:
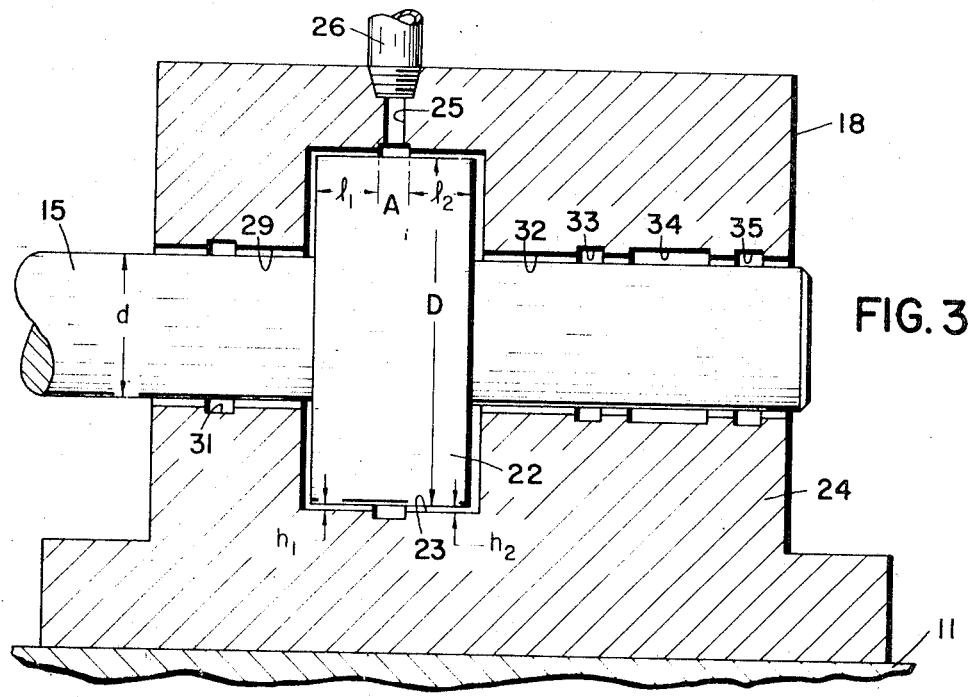
FIG. 3 is a vertical sectional view of a portion of the apparatus.

In FIG. 3 it can be seen that the end of the screw 15 is provided with a piston 22 which is slidable in a bore 23 formed in a housing 24 forming part of the damper 18. The housing 24 is mounted, of course, on the base 11 and is provided with a passage 25 connected by a conduit 26 to a source of pressure fluid, including a pump 27 and a pressure-regulating valve 28 (see FIG. 1). For the purpose of calculating the dashpot strength C, the diameter of the piston 22 is indicated by the reference D, the diameter of the end of the screw 15 by the reference d, the clearance between the piston 22 and the bore 23 by the reference $h_1$, the distance from the passage 25 to the end of the piston by the reference $l_1$, the distance from the passage 25 to the other end of the piston by the reference $l_2$, and the gap or clearance between the piston 22 and the bore 23 on the right side of the passage 25 by the reference $h_2$. It should be noted that the bore 23 is somewhat longer than the piston 22 by an amount at least equal to any thermal expansion and contraction of the screw 15. At the left side of of the piston the housing 24 is provided with a bore 29 with a radius $r_3$, and at a distance from the bore 23 into the bore 29 lies a relief groove 31. Similarly, at the right side of the piston 22, the screw 15 lies in a bore 32 having a radius $r_4$ leading to a relief groove 33 and to further grooves 34 and 35. The oil flowing from both ends of the bore 23 cooperate with the grooves 31, 33, and 35. The hydrostatic pockets 34 form a stiff radial bearing for supporting the screw 15 in the lateral direction.

The operation of the apparatus will now be readily understood in view of the above description. It is known that damping in the feed direction plays an important role in determining the chatter characteristics of servodriven feed slides. Studies have shown that the damping forces in the feed direction on plain slideways fall rapidly to insignificant values as the feed rate is increased. Hydrostatic slideways have many advantages to offer, but they, too, exhibit even lower damping in the feed direction.

As shown in FIG. 1, the ball screw 15, which is driven by the servomotor 17, is supported at the left-hand end by a bearing 19 capable of absorbing radial and thrust loads. The right-hand end is supported by a hydrostatic radial load-carrying bearing in the form of pockets 34 and a damper in the form of piston 22 and restrictions at 29 and 32. Since the stiffness which is felt by the table 14 is either $K_1$ or $(K_1+K_2)$, depending on whether the right-hand end of the screw is restrained axially or not, it is desirable to fix the right-hand end in order to achieve the greatest rigidity. However, if this is done by using a conventional thrust bearing, thermal expansions of the ball screw due to rapid traverse motions cause large induced axial forces in the ball screw. On the other hand, by restraining the right-hand end of the ball screw with the present damper or heavy dashpot, this end of the screw appears fixed against axial vibration but accommodates thermal expansion. In addition, the dashpot or damper 18 acting through the spring $K_2$ can be used to damp the slide. The mathematics of the situation works out in the following manner:

EQUATIONS OF MOTION $$M\ddot{X}_1 + (K_1 + K_2)X_1 = K_2X_2 + P_0 e^{j\omega t} \quad (1)$$

$$C\dot{X}_2 + K_2X_2 = K_2X_1 \quad (2)$$

THE SOLUTION OF THESE IS $$\frac{X_1}{P_0} = \frac{\sqrt{1 + \frac{C^2 K_1}{JK_2^2 M}\left(\frac{W}{W_1}\right)^2}}{K_1 \sqrt{a^2 + b^2}} \quad (3)$$

where $$a = 1 - W^2/W_1^2$$
$$b = CW_1(K_1 + K_2)/K_1 K_2 \cdot W/W_1 - CW_1/K_2 \cdot W/W_1$$
$$W_1 = \sqrt{\frac{K_1}{M}}$$

Figure 4:
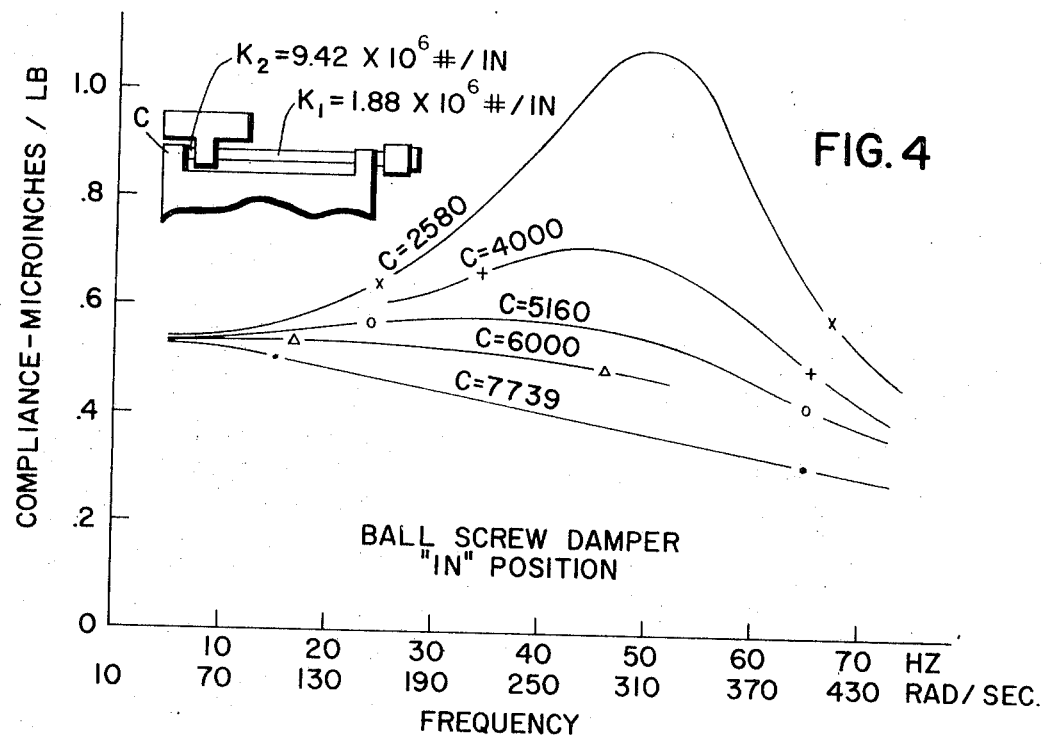
FIGS. 4, 5, and 6 are graphs of operation of the apparatus shown in FIG. 3.
Figure 5:
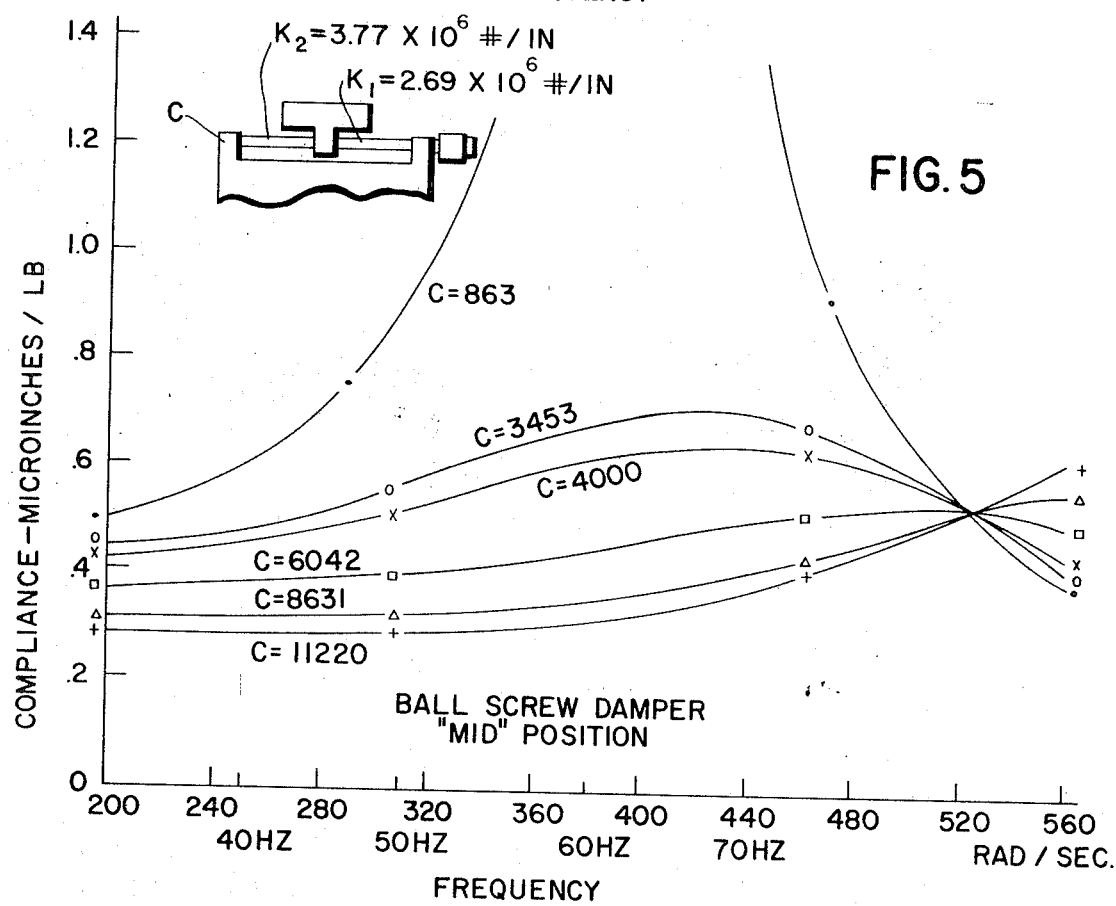
Figure 6:
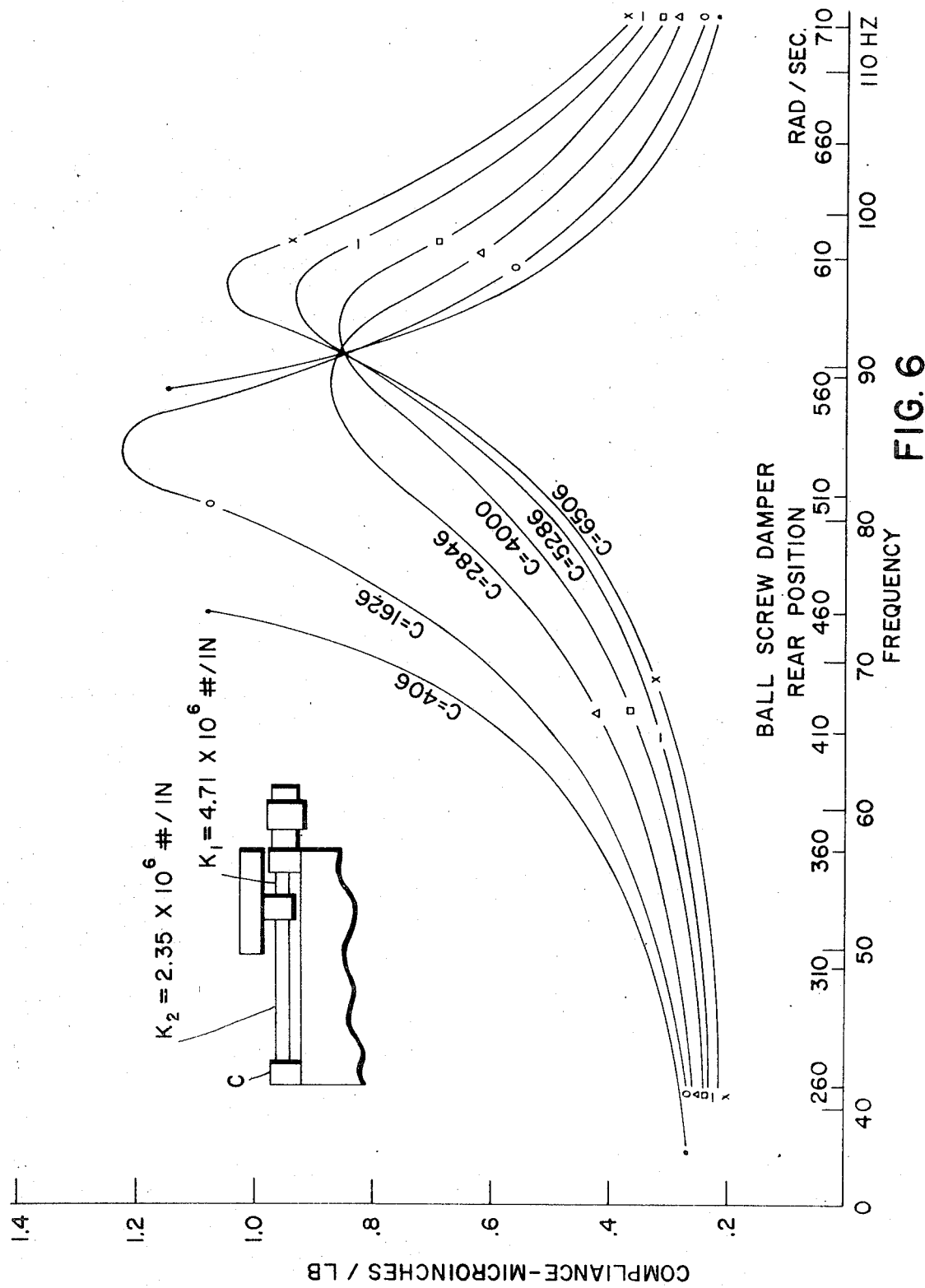

Using the Equation (3) to obtain the dynamic compliance, a computer program was written. With this program, the dashpot strength $C$ can be optimized to produce the greatest dynamic stiffness (least dynamic compliance) at the slide. FIG. 6 shows the dynamic compliance in microinches per pound for the slide in the rearmost position, the data being prepared for a 7,000-pound table on a 2-inch diameter ball screw with a 30-inch stroke. The behavior at the midposition is shown in FIG. 5, while the behavior in the closest or "IN" position is shown in FIG. 4, and the behavior in the "OUT" position is shown in FIG. 6. Since machine tool cutting is done only in the "IN" or midposition, these two graphs are the most significant. It can be seen that, at low values of dashpot strength $C$, the compliance peaks up in the neighborhood of 50 to 60 cycles per second, but, for higher values of $C$, the compliance is greatly reduced. With the table at the "IN" position, the greater the dashpot or damper strength, the lower the compliance. For the midposition, however, excessively large dashpot strength C can cause a rise in compliance, so that an optimum value exists in the neighborhood of $C = 6,042$ lb.sec.in.$^{-1}$.

Referring to FIG. 3, the central passage 25 is fed with supply pressure $P_s$. The flow divides and flows left and right through the clearance spaces $h_1$ and $h_2$ to the piston area A. The axial "stroke" of this piston is set large enough to accommodate the thermal expansion of the ball screw. Axial vibration of the ball screw due to operations being performed on the table 14 causes the pressure to rise and fall on each side of the piston area A, thereby resulting in a damping action.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising
   a. a base,
   b. a table mounted on ways forming part of the base for linear sliding movement thereover,
   c. a screw extending parallel to the ways,
   d. a ball-type nut fastened to the table and operatively engageable with an intermediate portion of the screw,
   e. a rotary operating motor fastened to the base and driving one end of the screw, and
   f. a damper at the other end of the screw, the damper consisting of a housing fastened to the base, a piston fastened to the screw, the piston being movable in a bore in the housing, and a fluid pressure source connected to the intermediate part of the bore, there being a clearance between the piston and the bore to allow the passage of fluid to the ends.

2. A machine tool as recited in claim 1, wherein the end of the screw adjacent the motor is supported by a bearing capable of absorbing radial and thrust loads.

3. A machine tool as recited in claim 1, wherein the damper is capable of absorbing radial loads.

4. A machine tool as recited in claim 1, wherein the motor is a servomotor.

5. A machine tool as recited in claim 1, wherein the bore is longer than the piston by an amount larger than any thermal expansion of the screw that may take place.

* * * * *